April 21, 1925.

L. MILLER 1,534,239

SANDING DEVICE FOR AUTOMOBILES

Filed Feb. 14, 1924

WITNESSES

INVENTOR
Louis Miller.
BY
ATTORNEYS

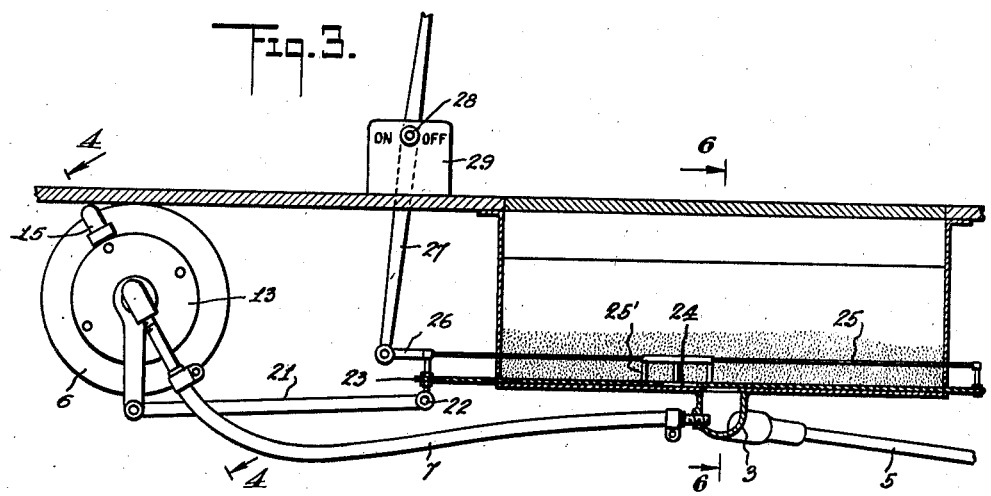
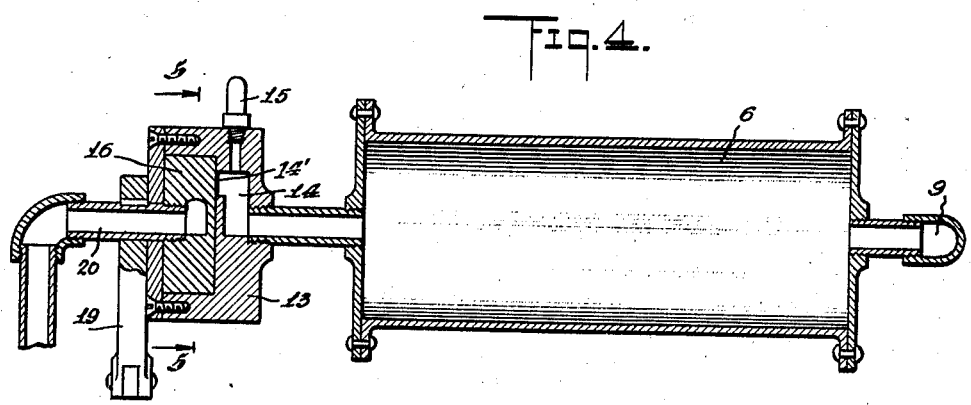
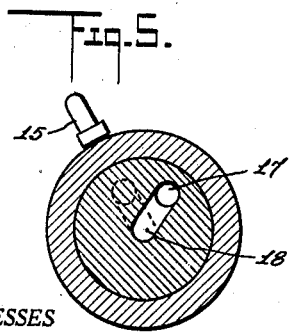
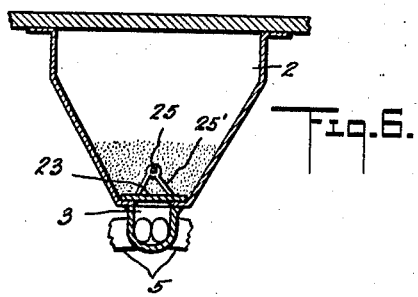

Patented Apr. 21, 1925.

1,534,239

UNITED STATES PATENT OFFICE.

LOUIS MILLER, OF BROOKLYN, NEW YORK.

SANDING DEVICE FOR AUTOMOBILES.

Application filed February 14, 1924. Serial No. 692,859.

*To all whom it may concern:*

Be it known that I, LOUIS MILLER, a citizen of the United States, and a resident of the city of New York, borough of Brooklyn, in the county of Kings and State of New York, have invented new and Improved Sanding Devices for Automobiles, of which the following is a full, clear, and exact description.

This invention relates to sanding devices for automobiles and other vehicles and has for an object to provide a construction which is an improvement over my prior Patent No. 1,420,428.

The object in view is to provide an improved construction wherein a less number of parts are used than in my prior patent and certain operating parts simplified whereby quick and certain results may be secured at all times.

Another object is to provide a sanding device for automobiles wherein a constant supply of air is provided as long as the engine is operating, the arrangement being such that the air may be turned on for spraying sand at any time.

In the accompanying drawings—

Figure 3 is an enlarged fragmentary sectional view through Figure 2, approximately on line 3—3.

Figure 4 is a fragmentary sectional view through Figure 3, approximately on line 4—4.

Figure 5 is a fragmentary sectional view through Figure 4, approximately on line 5—5.

Figure 6 is a transverse sectional view through Figure 3 on line 6—6.

Figure 1:
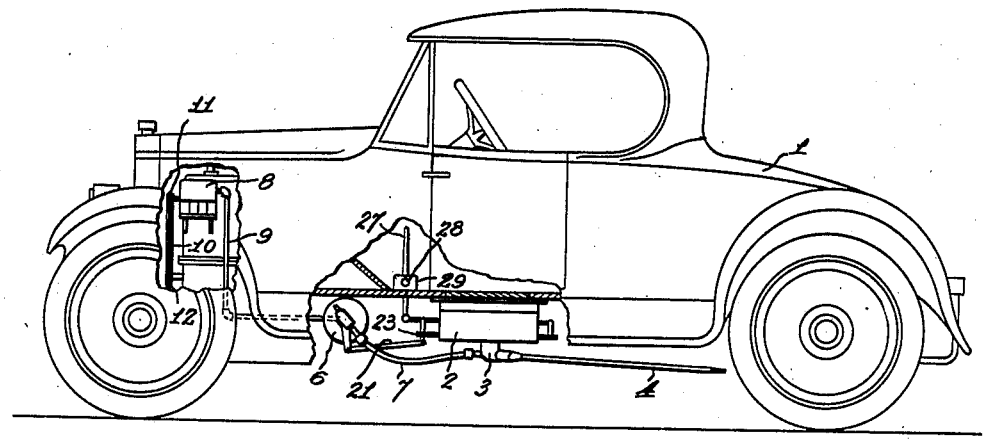
Figure 1 is a side view of an automobile with certain parts broken away in order to better illustrate how the invention is mounted on the automobile.
Figure 2:
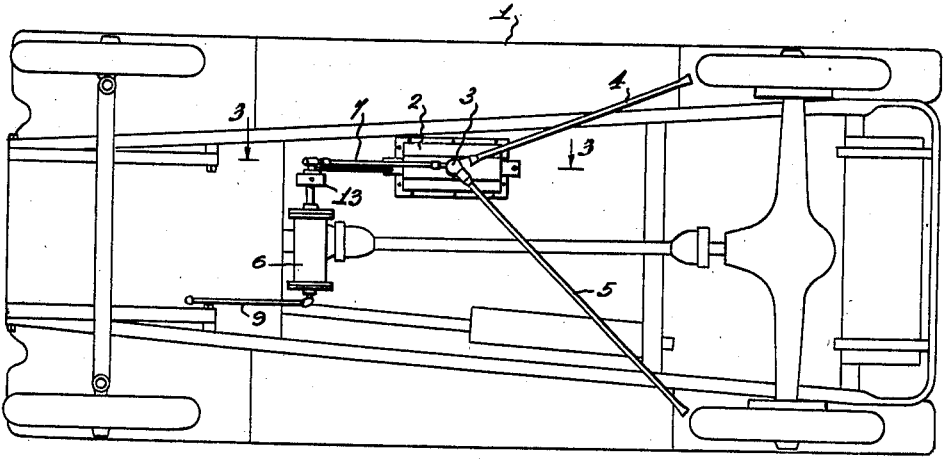
Figure 2 is a bottom plan view of the structure shown in Figure 1 illustrating how the parts are located and how the sand is led to the point adjacent the two rear wheels of the automobile.

Referring to the accompanying drawing by numerals, 1 indicates an automobile of any desired kind to which the sanding device embodying the invention is shown applied in Figures 1 and 2. In my prior invention above mentioned, a large number of pipes for directing the sand from a central point is shown but in actual operation a less number of pipes will produce desirable results and with a less number of pipes, an extremely simple feeding and releasing mechanism may be used.

As indicated in Figure 1, a sand box or container 2 is connected in any desired manner with the automobile 1 and discharges into what may be termed a cup 3 from which the sand passes through the pipes 4 and 5 to a point near the rear wheels of the automobile. An air tank 6 supplies air through the flexible tube 7 to the cup 3 for loosening up the sand in the cup for causing the sand to be sprayed when it is discharged from the pipes 4 and 5. A pump 8 of any desired kind supplies air through a suitable pipe 9 to tank 6. The pump 8 is driven by the engine of the automobile through a suitable chain 10 mounted on the sprocket wheel 11 and on a suitable sprocket 12, the latter sprocket being connected preferably to the crank shaft of the engine while the sprocket wheel 11 is connected to the operating shaft of the pump. The pump 8 continues to operate as long as the engine operates and, consequently, is continually forcing air into the tank 6.

In order to prevent the pressure from rising too high in tank 6, said tank is connected to a fitting 13, which fitting has a chamber 14 opening into the relief blow-off valve 15 whereby whenever the pressure reaches a certain point, this valve will open and will release all excess pressure. A rotary valve member 16 is arranged in the fitting 13, said valve member being provided with a bore 17 and a slot 18. The bore 17 is designed to be brought into mesh with the laterally extending portion 14' of chamber 14 whenever air is being supplied to the pipe or flexible tube 7 from tank 6. In order that the parts may properly function, an arm 19 is rigidly secured to the tube 20 which in turn is screwed into the valve member 16 so as to rotate therewith. The movement of the valve member 16 is only slight as indicated in dotted lines in Figure 5 and, consequently, the arm 19 may rock back and forth for only a short distance. A link 21 is connected to the outer end of arm 19 and pivotally connected at 22 to the slide 23, which slide extends longitudinally through the sand container 2. The slide 23 acts as a sand valve and is formed with an opening 24 adapted to be brought into registry with the open upper part of the cup 3. When this occurs, sand will automatically drop by gravity into cup 3 and air will be forced from the tank 6 through pipe or tube 7 and discharged into the cup 3 where it will mix with the sand and will blow the sand out through the respective pipes 4 and 5 which have one end connected to the cup 3. A stiffening and bracing rod 25 is also connected to the slide 23 and spaced a short distance therefrom. Preferably the rod 25 is provided with a forward extension 26 to which the lower end of lever 27 is pivotally connected, said lever being pivotally mounted at 28 on a suitable bracket 29 carried by the automobile 1.

When the parts are in the position shown in Figure 3, no sand is flowing but if the lever 23 was pushed over to the opposite extreme, sand would readily drop into the cup 3 and air would be forced simultaneously therein so that the sand and air would mix and quickly pass out through the pipes 4 and 5. As much or little sand may be allowed to flow as desired. It will be noted that the air and sand are so associated, that both are simultaneously turned on and both are ready to function when properly turned on. As the slide or valve 23 is moved for causing the opening 24 to register with the cup 3, rod 25 will also move and in turn will move the stirring device 25' whereby the sand will flow more easily and in case it becomes more or less packed, this action will loosen the same each time the parts are actuated.

What I claim is:

1. A sanding device for automobiles and the like, comprising a sand container, a cup open to the container arranged therebeneath, a sliding plate arranged in the container formed with an opening and a plurality of stirring members, said plate acting as a sand valve, means for guiding the plate as it is actuated, a manually actuated lever for moving said plate stirring members and guiding means, a plurality of pipes extending from said cup for leading the sand therefrom to a point near certain of the wheels of the automobile, and means for forcing air into said cup whenever said sand valve is open.

2. A sanding device for automobiles, comprising a sand container connected to the automobile and provided with an opening in the bottom, a cup formed with an opening at the top connected with the sand container, said opening in the cup registering with the opening in the container, a plurality of pipes connected to said cups and extending to certain wheels of the automobile, for discharging sand therebeneath, a sand valve arranged in said container and above said cup for opening and closing the opening between the container and the cup, a tube connected with said cup for directing air therein, a valve interposed in said tube, a tank adapted to contain compressed air connected with said valve, a swinging manually actuated lever, a link operatively connected with said lever and actuated thereby for simultaneously opening said valve and the valve in the sand box whereby air and sand will be simultaneously discharged into said cup and from thence through said pipes, and an air pump actuated by the engine of the automobile for continually supplying air to said air container.

3. A sanding device for automobiles comprising a container having a discharge opening in the bottom, a cup open at the top positioned so that the opening in the cup will register with the opening in the sand container, an apertured sliding plate positioned in said container acting as a valve for the opening in said container, a plurality of upstanding stirring members connected with said apertured plate, a reciprocating rod rigidly secured to said upstanding stirring members extending to a point exteriorly of said container, a link connected to said plate and extending to a point exteriorly of said container, a manually actuated lever connected to said link and said rod for reciprocating the same, said plate and said stirring members, a plurality of pipes leading from said cup to points near certain of the wheels of the automobile, and means for forcing air into said cup whenever said valve is opened.

LOUIS MILLER.